(12) United States Patent
Mohan et al.

(10) Patent No.: US 11,014,448 B2
(45) Date of Patent: May 25, 2021

(54) METHODS AND SYSTEMS FOR CRUISE CONTROL VELOCITY TRACKING

(71) Applicant: Ford Global Technologies, LLC, Dearborn, MI (US)

(72) Inventors: Shankar Narayan Mohan, Ann Arbor, MI (US); John Ottavio Michelini, Livonia, MI (US); Steven J. Szwabowski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 16/202,014

(22) Filed: Nov. 27, 2018

(65) Prior Publication Data

US 2020/0164745 A1 May 28, 2020

(51) Int. Cl.
*B60K 31/00* (2006.01)
*G05B 13/04* (2006.01)
*F02D 29/02* (2006.01)
*B60K 6/40* (2007.10)
*B60L 15/20* (2006.01)
*B60W 20/00* (2016.01)

(52) U.S. Cl.
CPC .......... *B60K 31/0066* (2013.01); *F02D 29/02* (2013.01); *G05B 13/048* (2013.01); *B60K 6/40* (2013.01); *B60L 15/2045* (2013.01); *B60W 20/00* (2013.01); *B60Y 2200/91* (2013.01); *B60Y 2200/92* (2013.01); *F02D 2200/1002* (2013.01); *F02D 2200/501* (2013.01); *F02D 2250/18* (2013.01)

(58) Field of Classification Search
CPC .... B60K 31/0066; B60K 6/40; G05B 13/048; F02D 29/02; F02D 2200/501; F02D 2250/18; F02D 41/1402; F02D 2041/1433; F02D 2041/1412; F02D 41/1406; B60L 15/2045; B60L 50/61; B60L 2260/40; B60L 2240/423; B60Y 2200/92; B60W 20/00; Y02T 10/72; Y02T 10/62

See application file for complete search history.

(56) References Cited

U.S. PATENT DOCUMENTS

| | | | |
|---|---|---|---|
| 9,849,880 B2 | 12/2017 | D'Amato et al. | |
| 2010/0256852 A1* | 10/2010 | Mudalige | G08G 1/22 701/24 |
| 2013/0332015 A1* | 12/2013 | Dextreit | B60W 30/182 701/22 |
| 2016/0108732 A1 | 4/2016 | Huang et al. | |
| 2016/0297435 A1* | 10/2016 | D'Amato | B60W 10/04 |

OTHER PUBLICATIONS

Zhao, R. et al., "Real-Time Weighted Multi-Objective Model Predictive Controller for Adaptive Cruise Control Systems," International Journal of Automotive Technology, vol. 18, No. 2, Apr. 2017, 14 pages.
Mohan, S. et al., "Methods and Systems for Cruise Control," U.S. Appl. No. 15/863,728, filed Jan. 5, 2018, 32 pages.

\* cited by examiner

*Primary Examiner* — Anne Marie Antonucci
(74) *Attorney, Agent, or Firm* — Geoffrey Brumbaugh; McCoy Russell LLP (57) ABSTRACT

Methods and systems are provided for cruise control velocity tracking. In one example, the method or system may generate a torque command output via a velocity controller that allows for an error within bounds to reduce a fuel consumption amount, the torque command output selected from outcomes of a leader and follower game.

20 Claims, 5 Drawing Sheets

METHODS AND SYSTEMS FOR CRUISE CONTROL VELOCITY TRACKING

FIELD

The present description relates generally to methods and systems for controlling a vehicle torque output for energy efficient cruise control.

BACKGROUND/SUMMARY

Standard cruise controllers attempt to maintain a speed of a vehicle at a set-point speed. Typically, cruise controllers use current speed tracking error based on the set-point speed and a current vehicle speed to determine a required wheel torque. However, maintaining the speed of the vehicle at the set-point speed may lead to an increased amount of fuel consumption due to substantial variation in torque demands to maintain the speed of the vehicle at the set-point speed.

Other attempts to address issues related to excessive fuel consumption when in a cruise control mode include adapting multiple vehicle models to nonlinear model predictive control routines. One such example approach is shown by D'Amato et al. in U.S. Pat. No. 9,849,880. Therein, a vehicle dynamics model and a vehicle fuel consumption model are adapted to provide a nonlinear model predictive control routine including a model predictive cruise control approach.

However, the inventors herein have recognized potential issues with such approaches. As one example, due to technical difficulty, weights in such previous models for cruise control may not be tuned. Such failure to the tune the weights of these models may lead to inefficiencies with regards to reducing fuel consumption while maintaining a velocity of the vehicle within a threshold velocity of a set-point velocity. Or, in cases where the weights are tuned, such weight tuning may be performed in a manner which results in substantial computing load on a controller of the vehicle.

Thus, to at least partially address the above issues, the inventors have developed an approach to dynamically and adaptively tune weights on different terms of a cost function for a cruise control model. In at least one example, the approach for dynamically and adaptively tuning the weights ensures that the filtered value of the vehicle velocity is restricted to be within a predetermined band. In one example, the issues described above may be addressed by a method for generating a torque command output via a velocity controller that allows for an error within bounds to reduce a fuel consumption amount, the torque command output selected from outcomes of a leader and follower game (a similar problem can be posed in a hierarchical structure). The error may be a velocity tracking error within bounds, for example.

As one example, the leader and follower game may include a leader agent which outputs cost weights to a follower agent, where the follower agent uses the cost weights to solve an optimization problem. The outcomes from the leader agent and the follower agent in the leader and follower game are then analyzed to select and generate a torque command output. In at least one example, the torque command output is selected based on the outcome with a least amount of fuel consumption while still maintaining a velocity of the vehicle within a predetermined interval about a set-point velocity.

In this way, solving for the torque command may be carried out in a strategic manner which results in improved efficiency compared to previous approaches. Specifically, by utilizing the leader and follower game approach disclosed herein, the technical result of tuning cruise control weights and generating a torque command output may be achieved, resulting in improved overall vehicle efficiency during cruise control. Such improved overall vehicle efficiency during cruise control includes improved efficiency for both fuel consumption and maintaining the vehicle velocity within a predetermined velocity bounds.

Moreover, the leader and follower game approach may enable improved computing efficiency to perform weight tuning and generate a torque command in cruise control compared to previous approaches that may perform cruise control weight tuning. For example, the leader and follower game approach may enable improved computing efficiency for cruise control weight tuning and generating a torque command compared to approaches which simultaneously perform weight tuning and torque command generation. The leader and follower game approach may further enable improved computing efficiency over approaches which attempt to minimize a cost function subject to several constraints without utilizing leader and follower decision making.

Furthermore, the above approach may advantageously result in reduced fuel consumption due to improved accuracy from the weight tuning in generating a torque command that maintains the vehicle velocity within the predetermined interval about the set-point velocity while reducing an amount of fuel consumption. It is noted that such reduced fuel consumption may correspond to improved fuel economy, where fuel economy is defined as a ratio of the amount of fuel consumed to a distance the vehicle has traveled. The amount of fuel consumed may be by mass or by volume, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
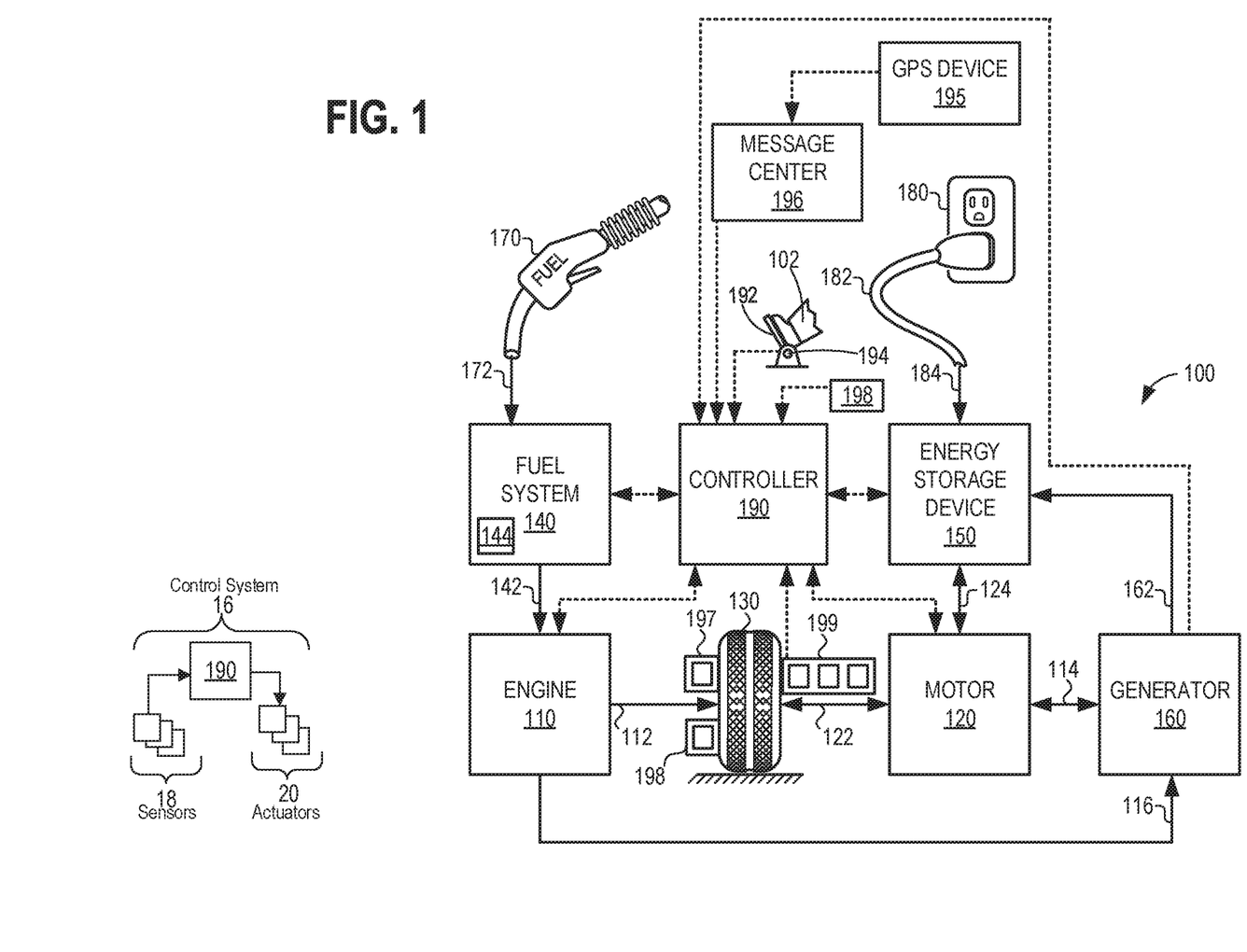
FIG. 1 shows a schematic of an example propulsion system for a vehicle, according to one or more embodiments of the present disclosure.
Figure 2:
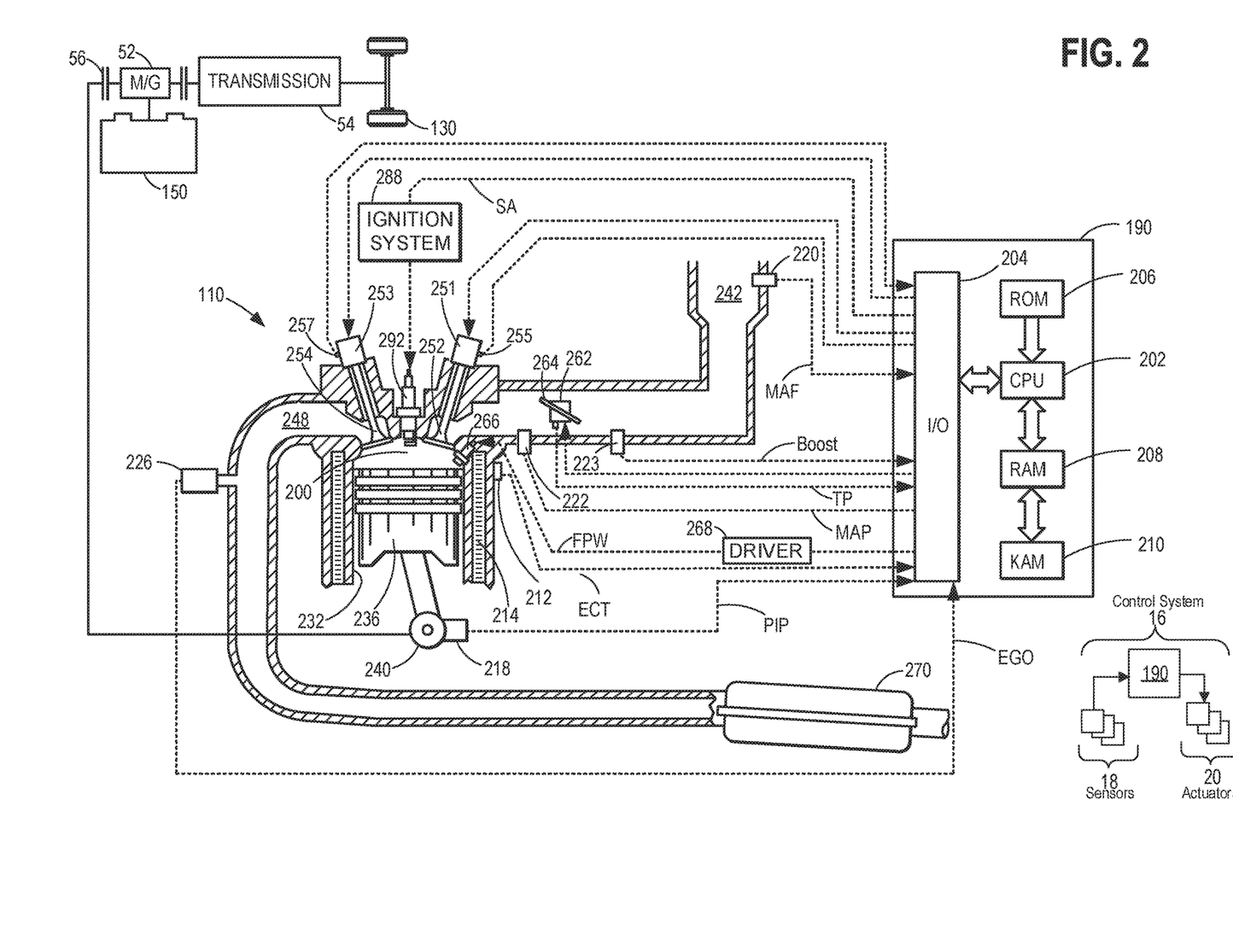
FIG. 2 shows a schematic of an example engine included in the propulsion system of FIG. 1, according to one or more embodiments of the present disclosure.

The following description relates to systems and methods for cruise control average velocity tracking. In at least one example, the systems and methods may be carried out via a vehicle such as shown in FIG. 1 and FIG. 2. The systems and methods for the cruise control average velocity tracking may include a processing flow path which calculates a torque command with a leader and follower game approach (e.g., Stackelberg game), as described at FIG. 5. For example, as discussed at FIG. 4, the torque command may be calculated based on a leader function and a follower function. The leader function, such as an MPCC weight tuning function, may output cost weights to be used in a follower function. In at least one example, the leader function may minimize all cost weights except for a fuel consumed cost weight, thus maximizing the fuel economy. The cost weights calculated via the leader function may then be output for processing via a follower function, such as an MPCC cost function. The follower function is solved using the cost weights output by the leader function. Furthermore, bounds, such as vehicle velocity and/or fuel consumption bounds, are enforced via the MPCC weight tuning function and/or the MPCC cost function to ensure that the torque command maintains a velocity of the vehicle within a predetermined interval about the set-point velocity. In at least one example, the bounds may include relaxing variables. That is, the bounds may be established with the inclusion of relaxing variables, where the relaxing variables may create an additional limit in relation to the bounds. Via the inclusion of relaxing variables, an adaptability of the model may be improved to enable output of a torque command during conditions in which strict adherence to the bounds may not be possible.

Further, the velocity of the vehicle may be a filtered vehicle velocity. Such filtered vehicle velocity may be based on an exponential weighted moving average (EWMA) of the vehicle velocity, in at least one example. Utilizing a filtered velocity of the vehicle may advantageously avoid overcorrection of the vehicle velocity. Further, a fuel economy of the vehicle may in turn be achieved by avoiding overcorrection of the vehicle velocity.

Figure 3:
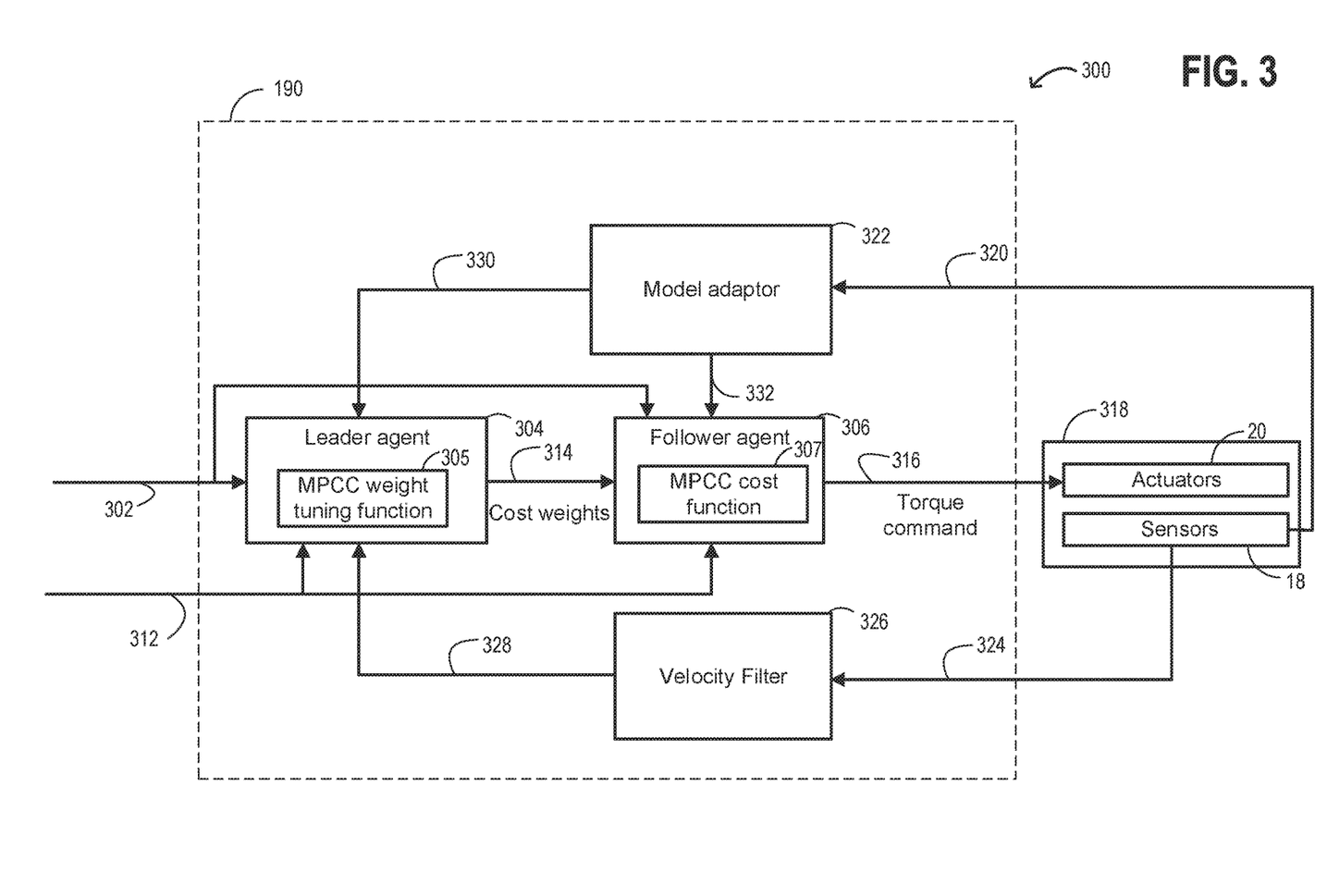
FIG. 3 shows a schematic of an example processing flow path, according to one or more embodiments of the present disclosure.

The leader and follower functions themselves may furthermore be updated in a closed-loop control manner based on sensor output of the vehicle. Furthermore, the processing of the leader function (e.g., MPCC weight tuning function) and the processing of the follower function (MPCC cost function) may occur in separate controller modules, as shown in FIG. 3. For example, the leader function may be processed via a leader agent of the controller and the follower function may be processed via an MPCC of the controller. In this way, real-time updates may be made to the torque command, resulting in improved tracking of a velocity set-point and improved fuel economy.

Turning now to FIG. 1, it illustrates an example of a vehicle propulsion system 100. Vehicle propulsion system 100 may comprise a fuel burning engine 110 and a motor 120. As a non-limiting example, engine 110 comprises an internal combustion engine and motor 120 comprises an electric motor. As such, vehicle propulsion system 100 may be a propulsion system for a hybrid-electric vehicle. However, vehicle propulsion system may also be a propulsion system for a non-hybrid vehicle, or an electric vehicle with an electric motor and no combustion engine. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). In other examples, where the vehicle propulsion system 100 is for an electric vehicle, vehicle propulsion system may be referred to as an electric vehicle (EV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may be configured to transition between two or more of the operating modes described above depending on vehicle operating conditions. As another example, vehicle propulsion system may be a propulsion system for an electric vehicle (e.g., with no combustion engine), wherein an electric motor receiving electric power from energy storage device 150 (e.g., a battery) may propel the vehicle.

Fuel system 140 may include one or more fuel storage tanks 144 for storing fuel on-board the vehicle. For example, fuel tank 144 may store one or more liquid fuels, including but not limited to gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, an exhaust-gas grid heater, an exhaust-gas recycle cooler, etc. As a non-limiting example, energy storage device 150 may include one or more batteries and/or capacitors.

Controller 190, also referred to herein as velocity controller, may communicate with one or more actuators 20, such as engine 110, motor 120, fuel system 140, energy storage device 150, and generator 160.

As will be described in FIG. 2, controller 190 may receive sensory feedback information from one or more sensors 18, such as wheel torque sensor 197, speed sensor 198, engine speed sensor 218, ambient temperature/humidity sensor, electrical load sensor, and a roll stability control sensor, such as a lateral and/or longitudinal and/or steering wheel position or yaw rate sensors 199.

Further, controller 190 may send control signals to one or more of engine 110, motor 120, fuel system 140, energy storage device 150, and generator 160 responsive to this sensory feedback from sensors 18. Controller 190 may receive an indication of an operator requested output of the vehicle propulsion system from a vehicle operator 102. For example, controller 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. As a further non-limiting example, vehicle propulsion system 100 may be configured as a plug-in electric vehicle (EV), whereby electrical energy may be supplied to energy storage device 150 from power source 180 via an electrical energy transmission cable 182. Controller 190 may further control the output of energy or power from energy storage device 150 (e.g., a battery) depending on the electric load of vehicle propulsion system 100. For example, during reduced electrical load operation, controller 190 may step-down the voltage delivered from energy storage device 150, via a an inverter/converter, in order to save energy.

During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Controller 190 may identify and/or control the amount of electrical energy stored at the energy storage device, which may be referred to as the state of charge (state-of-charge).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. A plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include ambient temperature/humidity sensor, electrical load sensor, and a roll stability control sensor, such as a lateral and/or longitudinal and/or steering wheel position or yaw rate sensors 199. A wheel torque sensor 197 may be mechanically coupled to the drive wheel 130 for measuring the instantaneous wheel torque. A speed sensor 198 may be coupled to the drive wheel 130 for measuring the instantaneous vehicle speed. Wheel torque also may be derived from engine torque, transmission gearing, and operation of a torque converter. Engine torque in turn may be derived from the mass of air flowing into the engine cylinders in the case of a gasoline engine combusting a stoichiometric mixture of air and fuel. In the case of a diesel engine, engine torque is related to the amount of fuel delivered to the engine cylinders.

The message center may include indicator light(s) and/or a text-based display in which messages are displayed to an operator, such as a message requesting an operator input to start the engine, as discussed below. Additionally or alternatively, the message center may communicate audio messages to the operator. The message center may also include various input portions for receiving an operator input, such as buttons, touch screens, voice input/recognition, GPS device 195, etc. It is noted that in at least one example, the GPS device 195 may be in the form of an external device that is communicatively coupled with the vehicle. For example, the GPS device 195 may be communicatively coupled with the message center 196 of the vehicle via a wireless or hardwire connection. In some examples, the GPS device 195 may be a mobile device The sensors 199 may include a vertical accelerometer to indicate road roughness and a lateral accelerometer. These devices may be connected to controller 190. In one example, the control system may adjust engine output and/or the wheel brakes to increase vehicle stability in response to sensors 199.

Referring now to FIG. 2, it illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, electric machine 52 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by controller 190 to vary the flow of intake air that is provided to the engine cylinders. Cylinder 200 can communicate with intake passage 242 via one or more intake valves 252. Cylinder 200 may exhaust products of combustion via exhaust valve 254 and exhaust passage 248. Cylinder 200 can communicate with exhaust passage 248 via one or more exhaust valves 254. Exhaust gas sensor 226 may be coupled to the exhaust passage for measuring the composition of the exhaust gas. Exhaust gas treatment device 270 may be coupled to the exhaust passage downstream of the exhaust gas sensor 226 for processing the exhaust gas before releasing it outside of the vehicle.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

The electric machine 52 may include motor or a motor/generator. Crankshaft 140 of engine 10 and electric machine 52 are connected via a transmission 54 to vehicle wheels 130 when one or more clutches 56 are engaged. In the depicted example, a first clutch 56 is provided between crankshaft 140 and electric machine 52, and a second clutch 56 is provided between electric machine 52 and transmission 54. Controller 190 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

A non-limiting example of controller 190 is depicted schematically in FIG. 2. Controller 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 of controller 190 can communicate with various sensors 18 and actuators 20 of engine 110, energy storage device 150, and fuel system 140 via an input/output device 204. As a non-limiting example, these sensors 18 may provide sensory feedback in the form of operating condition information to the control system, and may include: an indication of mass airflow (MAF) through intake passage 242 via air flow sensor 220, an indication of manifold air pressure (MAP) via pressure sensor 222, an indication of throttle position (TP) via throttle position sensor 262, an indication of engine coolant temperature (ECT) via temperature sensor 212 which may communicate with coolant passage 214, an indication of engine speed (PIP) via sensor 218, an indication of exhaust gas oxygen content via exhaust gas sensor 226, an indication of intake valve position via position sensor 255, an indication of exhaust valve position via position sensor 257, and an indication of boost pressure from pressure sensor 223.

The controller 190 receives signals from the various sensors of FIGS. 1-2 and employs the various actuators 20 of FIGS. 1-2 to adjust engine operation based on the received signals and instructions stored on a memory of the controller. For example, actuators 20 may include driver 268, and adjusting fuel injection timing may include adjusting the driver 268 to adjust the amount of fuel injected into the cylinder. Adjusting the amount of air charge in the cylinder may include adjusting the throttle by varying the position of the throttle plate, and the intake valve timing by actuating the intake valve actuator 251.

Turning now to FIG. 3, FIG. 3 shows a schematic 300 of an example processing flow path. It is noted that leader agent 304, follower agent 306, model adaptor 322, and velocity filter 326 may be separate modules stored as instructions within the memory of controller 190. The process flows, functionality, and methods described herein may be represented as instructions stored at the memory of the control system that may be executed by a processing subsystem of the controller. It is noted that the arrows within schematic 300 illustrate communicative connections between various components of the cruise control architecture. These communicative connections may include electrical signaling, for example.

As shown in FIG. 3, a velocity set-point 302 for cruise control is output to leader agent 304 and follower agent 306. The velocity set-point 302 is a target velocity for the vehicle to be moving at while the vehicle is operated in a cruise control mode. In at least one example, the velocity set-point 302 may be received via a user input. For example, the velocity set-point 302 may be received via a user input device of the vehicle. In other examples, the velocity set-point 302 may be generated via the controller of the vehicle (e.g., controller 190). In at least one example the vehicle disclosed herein may be an autonomous vehicle, and the controller (e.g., controller 190) may be a controller of the autonomous vehicle.

Additionally, a route grade 312 may be output to follower agent 306. In at least one example, outputting the route grade 312 to the follower agent 306 may include receiving a route request via a GPS device (e.g., GPS device 195) of the vehicle and then outputting the route grade 312 based on the route request and a current position of the vehicle. The route request may be received by a user input, for example. The route grade 312 may further be output to leader agent 304. In other examples, the route request may be generated via the controller of the vehicle, such as controller 190.

The route grade 312, the route request, and the current position of the vehicle may all be received via the GPS device. Additionally or alternatively, the route grade 312 may be based on one or more outputs of sensors 18, such as accelerometers or the lateral and/or longitudinal and/or steering wheel position or yaw rate sensors 199. One or more of the route grade 312, the route request, and the current position of the vehicle may be stored in a local memory accessible by the GPS device. Additionally or alternatively, one or more of the route grade 312, the route request, and the current position of the vehicle may be received over a network (e.g., via wireless communication with the GPS device or other broadcast receiving components of the vehicle).

Responsive to leader agent 304 receiving the velocity set-point 302, the leader agent 304 may calculate cost function weights 314 via a leader function to be used for generating a torque command output 316. The cost function weights 314 may include multiple weight values that are to be used for further processing at the follower agent 306 prior to selecting and generating the torque command output 316 for control of actuators 20 of the vehicle. Each of the cost function weights 314 output by the leader agent 304 may be used in a leader and follower game scenario analysis, as detailed below with reference to FIG. 5.

The cost function weights 314 calculated by the leader agent 304 may minimize all of the terms in the MPCC cost function 307 except for a fuel consumed cost weight. Thus, the leader agent 304 calculates cost weights to be used in the MPCC cost function 307 that maximize the fuel economy of MPCC cost function 307.

In one or more examples, the leader agent 304 may calculate the cost function weights 314 for the MPCC cost function 307 within bounds that ensure an average of the vehicle velocity after applying the MPCC based control is within a predetermined interval about the set-point 302. Each of these cost function weights may then be further evaluated via the follower agent 306.

However, in one or more examples, the leader agent 304 may calculate the cost function weights 314 to be used in the MPCC cost function 307 without taking into account bounds to maintain the average vehicle velocity within the predetermined interval about the set-point 302. In examples where the leader agent 304 calculates the cost function weights 314 without bounds to maintain the average vehicle velocity within the predetermined interval about the set-point 302, follower agent 306 may enforce such bounds to ensure that a torque command output 316 to vehicle actuators 318 will result in the vehicle velocity being maintained within the predetermined interval about the set-point 302.

The leader agent 304 may utilize a leader function, such as MPCC weight tuning function 305, to determine cost weights 314 to output to the follower agent 306. The MPCC weight tuning function 305 evaluates objectives at a time instant k. Further, the MPCC weight tuning function 305 minimizes the weights of all the terms in the MPCC cost function 307 except for a fuel consumed.

In one or more examples, the MPCC weight tuning function 305 may be in the form of below example Equation 1:

$$\min_{q} \|q\|_W^2 \quad \text{Equation 1}$$

subject to:

$$|\lambda \bar{v}_k + (1-\lambda)(\alpha_0 v_k^2 + \alpha_1 T_k + \alpha_2 \phi_k + \alpha_3 - v_{ref}| \leq \epsilon$$

$$T_k = \pi(v_k, \Phi_k, q)$$

$$Aq = b$$

$$q \geq 0$$

Wherein, in Equation 1, q is a vector of weights; W is a weighting matrix that relatively penalizes the weights of the other terms in the MPCC cost function 307 (e.g., Equation 2); $\lambda$ is a forgetting factor of a moving average filter of the vehicle velocity, such as an exponentially moving average (EWMA) filter of the vehicle velocity; $\bar{v}$ is a historical average velocity; $\alpha_*$ are coefficients, which may be adapted in real-time based on sensor output; $\phi$ is a route grade over the prediction horizon; $v_{ref}$ is a reference velocity, such as a most recently stored average velocity; $\in$ is a width of a predetermined band (also referred to as the predetermined interval) about the set-point within which the moving average of the vehicle velocity must reside; $\pi(v_k, \Phi_k, q)$ is a function that returns an optimal solution to the MPCC cost function 307 (e.g., Equation 2) for a given vehicle velocity, route grade over the prediction horizon, and weights q; and matrix A and vector b define a linear relationship between the cost function weights of the MPCC cost function 307 (e.g., Equation 2). It is noted that variables with subscript k refer to a value associated with that variable at time instant k. As to $\Phi_k$ (route grade over a prediction horizon), the prediction horizon for $\Phi_k$ is a time period from time instant k to a predetermined future time (e.g., k+N). The route grade value $\phi$ for the prediction horizon may take into account grade information, a vehicle route and associated route grade information, and velocity information of the vehicle at time instant k extrapolated out to the predetermined future time. Moreover, with regards to the $\pi(v_k, \Phi_k, q)$ function, it is noted that in at least one example where an analytical form for $\pi(v_k, \Phi_k, q)$ is not readily available, $\pi(v_k, \Phi_k, q)$ may be represented by a deep neural network.

The MPCC weight tuning function 305 may be adaptable in a closed-loop manner. The MPCC weight tuning function 305 may be adapted based on output from one or more sensors 18. In particular, a velocity may be updated based on sensors 18 such as one or more of wheel torque sensor 197, speed sensor 198, and engine speed sensor 218. Coefficients $\alpha_*$ may also be updated based on output from sensors 18. For example, outputs from the lateral and/or longitudinal and/or steering wheel position or yaw rate sensors 199 may be used to update a coefficient of the route grade over the prediction horizon.

Thus, via the above, the leader agent 304 may calculate the cost function weights 314 to be used in an MPCC cost function 307.

Once leader agent 304 calculates the cost function weights 314 of the MPCC cost function 307, leader agent 304 outputs the cost function weights 314 to the follower agent 306.

After receiving the cost function weights 314 at follower agent 306, follower agent 306 calculates at least one potential torque command. For example, the leader agent 304 may output multiple cost function weights 314 to follower agent 306, and the follower agent 306 may generate at least one potential torque command for each cost function weight received. The follower agent 306 may calculate potential torque command(s) based on a follower function, such as the MPCC cost function 307, using the cost function weights 314 received from the leader agent 304.

Put another way, follower agent 306 utilizes cost function weights as calculated by the leader agent 304 to solve the MPCC cost function 307.

The torque command output 316 may be an amount of torque to the wheels that adjusts an average velocity to be closer to the velocity set-point 302. Though the torque command output 316 may not result in adjustment the vehicle velocity all the way to the set-point, it is noted that the torque command output 316 is at least an amount of torque required to adjust the average vehicle velocity to be within the predetermined interval about the velocity set-point 302.

For example, if an average vehicle speed is 8 miles per hour (mph) less than the velocity set-point 302, and the predetermined interval about the velocity set-point is 5 mph, then the torque command output 316 may only be sufficient to increase the average vehicle speed by 3 mph.

Whether or not the torque command output 316 is sufficient to adjust the average vehicle speed to be the velocity set-point 302 is dependent upon fuel consumption. That is, if a torque command to operate the vehicle at the velocity set-point also minimizes the fuel consumption, then the vehicle will be operated at the velocity set-point 302. Otherwise, a torque command which minimizes the fuel consumption and results in the average vehicle speed being within the predetermined interval about the velocity set-point 302 is commanded.

In one or more examples, the MPCC cost function 307 used by follower agent 306 may take the form of below example Equation 2:

$$\min_{T^e_i \in [1, N-1]} q_0 \left( \frac{1}{N} \sum_{i=1}^{N} v_i - v_{ref} \right)^2 +$$

$$q_1(v_N - v_{ref}) + \sum_{i=0}^{N-1} m_f(v_i, T^e_i) + q_2(T^e_i - T^e_{i-1})^2$$

$$\text{Subject to: } v_{min} \leq v_i \leq v_{max}, \forall i \in [1, N]$$

$$T_{min}(v_i) \leq T^e_i \leq T_{max}(v_i), \forall i \in [1, N]$$

$$v_{i+1} = \alpha_0 v_i^2 + \alpha_1 T^e_i + \alpha_2 \phi_i + \alpha_3$$

Equation 2

The MPCC cost function 307 evaluates objectives over a prediction horizon from current time instant i to future time instant N. As such, variables including subscript i refer to a value of the variable associated with time instant i. For example, $v_i$ is a velocity of the vehicle; $T^e_i$ is the engine torque; $\phi_i$ is the route grade at time instant i, also referred to as the ith sample; and $m_f(v_i, T^e_i)$ is a function that returns the fuel consumed as a function of vehicle speed and engine torque. Time instant i may be a same time instant as time instant k, in at least one example.

It is noted that of the terms within Equation 2 is weighted by q except for the fuel consumed, $m_f(v_i, T^e_i)$. Thus, in this way minimizing of q in Equation 1 minimizes all of the MPCC cost function terms except for the fuel consumed.

Thus, by the leader agent 304 calculating the cost weights 314 and the follower agent 306 solving for the MPCC cost function 307 based on the cost weights 314, the technical result of solving for torque command with leader and follower (e.g., Stackelberg) game logic is achieved.

Figure 5:
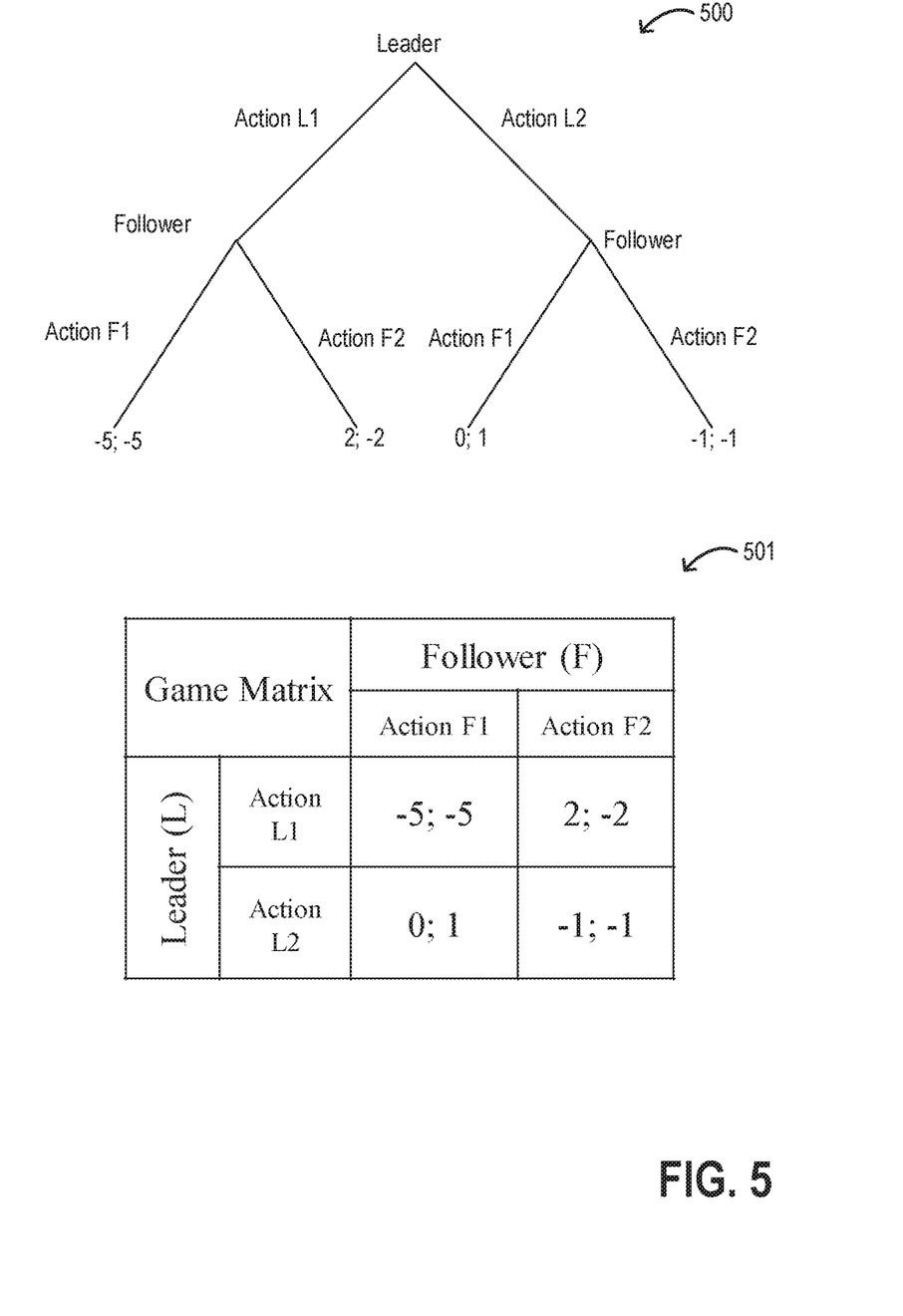
FIG. 5 shows a schematic illustrating a Stackelberg game, according to one or more embodiments of the present disclosure.

That is, the leader agent 304 is a leader function and the follower agent 306 is a follower function that is based on the leader decision in accordance with a leader and follower (e.g., Stackelberg) game approach. For reference, looking now to FIG. 5, a schematic illustrating an example leader and follower game. The leader and follower game shown in FIG. 5 is a Stackelberg game. In particular, FIG. 5 shows a b-tree diagram 500 and an outcome matrix 501 of an example Stackelberg game.

As shown in b-tree diagram 500, a leader agent, shown as leader, of the Stackelberg game has the option to take either Action L1 or Action L2. Then, responsive to each of Action L1 and Action L2 of the leader agent, a follower agent, shown as follower, of the Stackelberg game either takes Action F1 or Action F2.

Put another way, the leader agent and the follower agent take actions in sequence, where the leader agent takes an action (e.g., Action L1 or Action L2) and then the follower agent takes an action (e.g., Action F1 or Action F2). Thus, in this particular example, there are four possible outcomes. It is noted that in other examples, the leader agent and/or the follower agent may be able to take more than two actions, resulting in more than four possible outcomes.

The possible outcomes from b-tree 500 are listed in the outcome matrix 501. As shown in the outcome matrix 501, the rewards achieved by the leader agent and the follower agent in a given outcome may be the same. For example, as seen in FIG. 5, Action L1 followed by Action F1 results in the same reward (−5; −5) for the leader and the follower, respectively. However, the rewards achieved by the leader agent and the follower agent for a given outcome are often different. For example, Action L1 followed by Action F2 results in different rewards (2; −2) for the leader and the follower, respectively. It is noted that the reward values of the outcomes shown in FIG. 5 are for illustrative purposes.

Applying the Stackelberg illustration to the context of the present disclosure, each action of the leader agent (e.g., Action L1, Action L2) may be a different cost weight. For example, the leader agent may correspond to leader agent 304, and each action of the leader agent (e.g., Action L1, Action L2) may correspond to one of the cost weights 314 output by the leader agent 304. Each of the cost weights output by the leader agent may be based on a weight tuning function, where a velocity of the vehicle is allowed to vary about a set-point velocity in the weight tuning function. In at least one example, the weight tuning function may be a function such as MPCC weight tuning function 305. The cost weights output by the leader agent are based on a function that allows a velocity of a vehicle to vary within bounds, such as the predetermined interval about the set-point velocity discussed in other examples herein.

Once the potential torque commands are calculated by the follower agent based on the cost weights output by the leader agent, the outcomes are analyzed. For example, the outcomes may include one or more of predicted fuel consumption costs and predicted velocity of a vehicle for a given torque command output. The torque command to be output for adjustment of the vehicle actuators may then be selected based on analysis of these outcomes. For example, a matrix of the outcomes may be analyzed to select the torque command to output to the vehicle actuators. In analyzing the outcomes, the torque command which predicts the least amount of fuel consumption while still being within the predetermined interval about the set-point velocity is output to actuators of the vehicle. The torque command which is output to the actuators may correspond to torque command output 316, and the actuators may correspond to actuators 20 of the vehicle, for example.

Put another way, using a leader and follower game (e.g., a Stackelberg game), sequential leader and follower actions are used to generate potential outcomes in a decision matrix, and these potential outcomes are analyzed to select a torque command output which results in the least amount of fuel consumption while still being within bounds of the predetermined interval about a set-point velocity.

Specifically, by utilizing the leader and follower game approach disclosed herein, cruise control weights may be tuned and a torque command output may be produced that results in improved overall vehicle efficiency, both for fuel consumption and for improved set-point velocity tracking of the vehicle. Moreover, the leader and follower game approach as disclosed herein may achieve improved computing efficiency for performing the weight tuning and torque command output generation compared to previous approaches for performing weight tuning and torque command generation.

It is noted that in at least one example, the leader agent 304 may only solve for one cost weight in the MPCC cost function at a time, and the MPCC weight tuning function 305 may then utilize a weighting matrix that relatively penalizes weights of remaining terms in the MPCC cost function. Thus, many parallel MPCC problems may be solved for different values of the cost function weight to produce many outcomes, and the smallest cost function weight value that satisfies constraints (e.g., an average vehicle velocity constraint, fuel consumption constraints, etc.) may be selected from the outcomes to be utilized.

That is, rather than all of the outcomes being calculated with limits to stay within bounds of error, the outcomes may be calculated without such limits, and then then the smallest cost function weight value that satisfies the bounds of error may be selected for further processing by the follower agent.

Turning back to FIG. 3, once the torque command output 316 is generated, the torque command output 316 is sent to vehicle actuators 20. In one or more examples, the vehicle actuators 20 may include one or more of engine 110 and motor 120. As discussed above, the torque command output 316 is at least an amount of torque required to adjust the vehicle speed from a current vehicle speed to a second speed that is within the predetermined interval about the velocity set-point 302. The torque command output 316 to vehicle subsystems 318, in particular the vehicle actuators 320, may be a difference between a current operating torque of the vehicle and an amount of torque required to adjust a speed of the vehicle to be within the predetermined interval about the velocity set-point 302.

Responsive to receiving the torque command output 316 at the vehicle actuators 20, operation of the vehicle actuators 20 may be adjusted. For example, operating parameters of one or more of the engine 110 and the motor 120, also referred to herein as vehicle torque actuators, may be adjusted. Such operating parameters of engine 110 may include an air fuel ratio (AFR), where the AFR may be adjusted by changing one or more of a throttle plate position and an amount of fuel injected by fuel injectors into one or more cylinders of the engine. As to adjusting operating parameters of motor 120, such operating parameters may include adjusting a voltage applied to the motor.

If the torque command output 316 requires an increase in torque, then one or more of a torque output of the engine 110 and a torque output of the motor 120 may be increased. By increasing the torque output of one or more of the engine 110 and the motor 120, an amount of wheel torque may be increased, in turn increasing a rotational speed of the vehicle wheels and a speed of the vehicle (also referred to herein as vehicle velocity).

On the other hand, if the torque command output 316 requires a decrease in torque, then one or more of a torque output of the engine 110 and a torque output of the motor 120 may be decreased. By decreasing the torque output of one or more of the engine 110 and the motor 120, an amount of wheel torque may be decreased, in turn decreasing a rotational speed of the vehicle wheels and a speed of the vehicle.

The vehicle subsystems 318 may output signals to controller 190. In particular, sensors 18 of the vehicle may output signals 320 to controller 190, including a model adaptor 322 of controller 190. Such output signals 320 from sensors 18 of the vehicle to the model adaptor 322 of controller 190 may be used to update coefficients of one or more of vehicle velocity values, a vehicle mass, and route grade preview.

The sensors 18 which output signals to the model adaptor 322 may include one or more of wheel torque sensor 197, speed sensor 198, engine speed sensor 218, and a roll stability control sensor, such as a lateral and/or longitudinal and/or steering wheel position or yaw rate sensors 199. Further, with regards to updating the route grade preview, a location of the vehicle as detected via the GPS device 195, a selected route for the vehicle, and associated route grade preview information may be sent to the model adaptor 322. Such route grade preview information may be stored locally in controller 190 and/or the GPS device 195. Alternatively, such route grade preview information may be output to the model adaptor 322 via a wireless connection. For example, the route grade preview information may be output to the model adaptor 322 via the GPS device 195 over a wireless network.

After updating the coefficients of the MPCC weight tuning function 305 and the MPCC cost function 307 based on the output signals 320, model adaptor 322 may send an updated MPCC weight tuning function 330 to leader agent 304. Additionally, the model adaptor 322 may send an updated MPCC cost function 332 to follower agent 306. The updated MPCC weight tuning function 330 and the updated MPCC cost function 332 may then be used to calculate an immediately subsequent torque command.

In addition to outputting signals from sensors 18 to model adaptor 322, the sensors 18 may further output signals 324 to velocity filter 326 of controller 190. For example, the output signals 324 may be one or more of an engine wheel torque, vehicle speed, and an engine speed. Velocity filter 326 may be an EWMA filter, in one or more examples. Velocity filter 326 may update a velocity average and output the updated velocity average 328 to leader agent 304. Leader agent 304 may then update the MPCC weight tuning function 305. The updated velocity average 328 may also be referred to herein as a filtered velocity, for example.

In cases where the MPCC weight tuning function 305 is in the form of Equation 1, the updated velocity average 328 may be used to update $\bar{v}$. Additionally, the updated velocity average 328 may further be used to update the other velocity (v) values, though it is possible to instead use a velocity that is based directly on one or more of the sensors 18 (e.g., wheel torque sensor 197, speed sensor 198, engine speed sensor 218) to update the other velocity values.

In this way, the MPCC weight tuning function 305 and the MPCC cost function 307 may be updated in real-time in a closed-loop manner. Moreover, by solving for torque command with a leader and follower game approach and by updating the models themselves, a more robust cruise control for velocity set-point tracking and fuel economy results.

Figure 4:
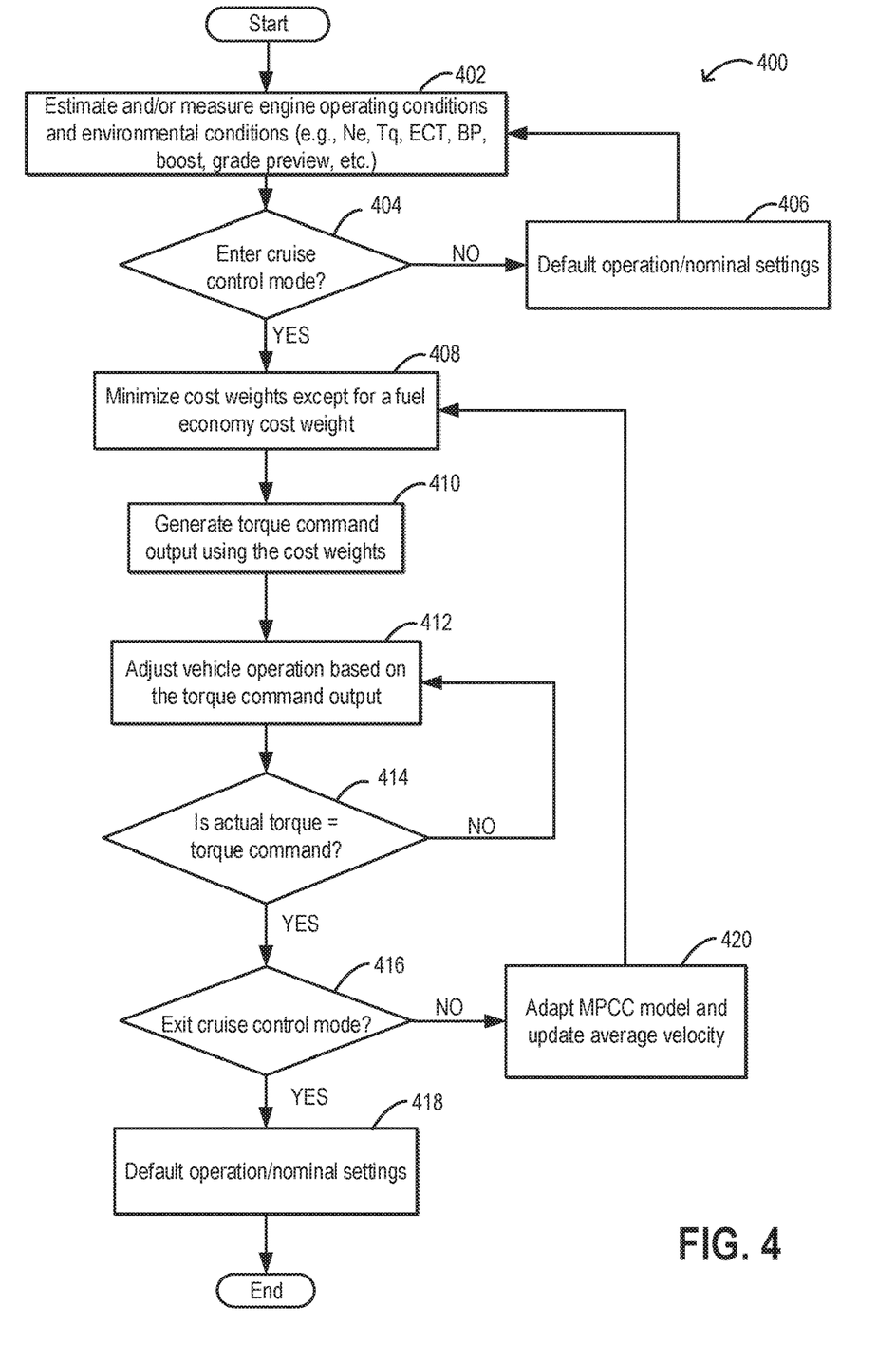
FIG. 4 shows a flow chart of an example method of cruise control, according to one or more embodiments of the present disclosure.

Turning to FIG. 4, FIG. 4 shows a flow chart 400 of an example method according to one or more embodiments of the present disclosure. Instructions for carrying out method 400 and the rest of the methods included herein may be executed by a controller (e.g., controller 190) based on instructions stored on a memory of the controller and in conjunction with signals received from sensors of the engine system, such as the sensors 18 described above with reference to FIG. 1 and FIG. 2. The controller may employ actuators, such as actuators 20, of the engine system to adjust engine operation, according to the methods described below.

Starting at step 402, method 400 may include estimating and/or measuring engine operating conditions and environmental conditions. For example, one or more of wheel torque, vehicle velocity, an engine speed, route grade preview, a location of the vehicle, a vehicle route, and a position of the vehicle (e.g., incline) may be estimated and/or measured based on output from vehicle sensors 18. The wheel torque may be detected via wheel torque sensor 197, the vehicle speed may be detected via speed sensor 198, and the engine speed may be detected via engine speed sensor 218.

As to the location of the vehicle, the vehicle route, and the route grade preview, a GPS device (e.g., GPS device 195) may be utilized to detect the location of the vehicle and to provide the vehicle route. Further, the GPS device may provide the route grade preview associated with the vehicle route. Additionally or alternatively, the location of the vehicle, the vehicle route, and the route grade may be stored in a local memory of the vehicle, such as memory of controller 190. The position of the vehicle may be based on roll stability sensors such as lateral and/or longitudinal and/or steering wheel position or yaw rate sensors 199.

Following step 402, method 400 includes determining whether or not to enter cruise control at step 404. As one example, the vehicle may enter the cruise control mode upon receiving a cruise control request from a vehicle operator. As another example, the vehicle may enter the cruise control mode responsive to a cruise control request signal from the controller. The controller may generate the signal based on engine operating conditions estimated at 402. The controller may generate the signal further based on information external from the vehicle, such as the vehicle route, route grade, and weather conditions.

Receiving the cruise control request includes receiving a velocity set-point. The velocity set-point may be received via an input from a vehicle operator. The velocity set-point may alternatively be set by the controller based on external information including a speed limit, vehicle route, route grade, and weather condition information. The controller may obtain the external information from the GPS device, broadcast, or sensors positioned on the vehicle, for example. The velocity set-point is a desired velocity at which the vehicle is to be maintained.

The vehicle may exit the cruise control mode responsive to an action of the operator, such as braking. The vehicle may also exit the cruise control mode responsive to an exit request generated from the controller. It is noted that such a request to exit the cruise control mode may cause termination of method 400 at any point during the method.

If it is determined to enter the cruise control mode, method 400 moves to 408. Otherwise, method 400 operates the vehicle with default operation/nominal settings at step 406 and continues to estimate and/or measure engine operating conditions and environmental conditions.

Moving to step 408, step 408 includes minimizing cost weights except for a fuel consumed cost weight. Minimizing the cost weights except for the fuel consumed cost weight may be based on a cost weights function of a leader agent, such as the MPCC weight tuning function 305. The cost weights function of the leader agent may be used to minimize the cost function weights may take into account the velocity set-point received at step 404. The cost weights calculated at step 408 of method 400 may output to a follower agent (e.g., follower agent 306) for further processing.

Following step 408, method 400 include generating a torque command output using the cost weights. For example, for each cost weight output by the leader agent, at least one potential torque command may be calculated by the follower agent. In some examples, each cost weight output by the leader agent may have one corresponding output by the follower agent. In other examples, each cost weight output by the leader agent may have multiple corresponding outputs by the follower agent.

The cost weights output by the leader agent may be used to minimize each term of the cost function of the follower agent except for a fuel consumed. The cost function may be MPCC cost function 307, for example.

Outcomes from sequentially calculating the cost weights and then the potential torque commands may be analyzed to select a torque command output. In at least one example, the torque command output selected may be associated with the outcome having the least amount of fuel consumed while still achieving a vehicle velocity that is within the predetermined interval about the set-point velocity.

In some examples, the leader function may enforce bounds to ensure that an average vehicle velocity after applying the MPCC-based control is within the predetermined interval about the set-point velocity. That is, the leader function may enforce bounds to ensure that the potential torque commands of the outcomes will all result in a vehicle velocity or an average vehicle velocity that is within the predetermined interval about the set-point velocity. In cases where the bounds ensure that the average vehicle velocity is within the predetermined interval about the set-point velocity, the average velocity may be based on a velocity filter, such as velocity filter 326, as described in reference to FIG. 3.

Thus, analysis of the outcomes may only require evaluating a fuel consumption cost, for example. Alternatively, however, bounds may not be enforced prior to generating the outcomes, and instead an approach that includes multiple parallel calculations may be used.

The predetermined interval may comprise an upper threshold and a lower threshold. The upper threshold may be a vehicle velocity greater than or equal to the set-point velocity. The lower threshold may be a vehicle velocity less than the set-point velocity. Thus, the predetermined interval about the set-point velocity may be a band about the set-point velocity determined to be acceptable. In some examples, the predetermined interval about the set-point velocity may be equally distributed above and below the set-point velocity. However, in other examples, the predetermined interval about the set-point velocity may not be equally distributed above and below the set-point velocity. For example, the predetermined interval may instead be distributed such that a tolerance below the set-point velocity is greater than the tolerance above the set-point velocity. That is, the predetermined interval enable a greater degree of underspeeding than a degree of overspeeding. Such an approach may help to avoid issues of exceeding speed limits and for improved fuel economy, for example. Alternatively, the predetermined interval may be distributed to enable a greater degree of overspeeding than under speed in relation to the set-point velocity.

Such adjustments in distribution of the predetermined interval about the set-point velocity may be dependent upon local speed limits, for example. Additionally or alternatively, the distribution of the predetermined interval about the set-point velocity may be dependent upon the route grade. Such local speed limits and the route grade may be determined via the GPS device, for example. In another example, the predetermined interval about the set-point velocity may be a preset speed programmed into the controller. For example, the preset speed for the predetermined interval may be 5 mph above the set-point velocity and 8 mph below the set-point velocity. Or, as another example, the preset speed for the predetermined interval may be 5 mph above the set-point velocity and 5 mph below the set-point velocity. In examples where the predetermined interval is a preset speed, the predetermined interval may be the same regardless of a location of the vehicle when in the cruise control mode. On the other hand, in approaches where local speed limits are taken into account to determine the predetermined interval, the predetermined interval may be adapted dependent upon a location of the vehicle.

After calculating the torque command using the cost weights at step 410, method 400 may include adjusting vehicle operation based on the torque command. Adjusting vehicle operation may include controlling one or more actuators of the vehicle to increase or reduce a torque output of the engine and/or the motor. The engine may be an engine including one or more features of engine 110 and the motor may be a motor including one or more of the features of motor 120, for example. By increasing or reducing the torque output of the engine and/or the motor the velocity of the vehicle may be increased or decreased, respectively. In some examples, an amount of torque provided by the engine and/or the motor may be based at least in part on a state of charge of energy storage device, such as energy storage device 150.

For example, if the energy storage is greater than a threshold (e.g., greater than 50%), then the torque may be provided by motor. On the other hand, if the energy storage device state of charge is less than the threshold, then the torque may be provided by the engine. In cases where the energy storage device state of charge is less than the threshold, the vehicle may further be operated in a regeneration mode to replenish energy stored in the energy storage device. It is further possible that both the engine and the motor may simultaneously be operated provide torque to the wheels.

In addition to the above, an amount of the torque command may impact a distribution between an amount of torque provided by the engine and an amount of torque provided by the motor. For example, when the torque command is greater than a threshold amount of torque that the motor is able to provide, then the engine may be relied upon to meet the torque command. Or, when the torque command is less than the threshold amount of torque that the motor is able to provide, then the motor 120 may be relied upon to meet the torque command. The threshold amount of torque that the motor is able to provide may be based on the state of charge of the energy storage device, for example.

In cases where engine torque output is adjusted responsive to the torque command, one or more of a fuel injector driver, a position of throttle plate, a position of one or more clutches, and spark plug actuator control may be adjusted. For example, an air-fuel ratio of engine combustion gases and an air charge supplied to the engine may be adjusted via such actuator controls.

Additionally, with regards to adjusting control of the motor, adjusting motor operation may include adjusting an amount of energy from the energy storage device that is utilized by motor.

Following step 412, step 414 includes monitoring whether an actual torque is equal to the torque command. If not, then vehicle operation continues to be adjusted until the actual torque is equal to the torque command.

Once the actual torque is equal to the torque command, method 400 includes evaluating whether to exit the cruise control mode 416. The vehicle may exit the cruise control mode responsive to an action of the operator, such as braking. The vehicle may also exit the cruise control mode responsive to an exit request generated from the controller.

If the cruise control mode is to be exited, then method 400 includes transitioning to a default mode in which the vehicle is operated with the default operation and nominal settings at step 418.

If the cruise control is not to be exited at 416, then method 400 includes adapting the MPCC model and updating the average velocity at step 420. After adapting the MPCC model and the average velocity at step 420, method 400 may include continuing to carry out operation of the vehicle in the cruise control mode at steps 408-414.

Adapting the MPCC model at step 420 may include adapting one or both of the leader function and the follower function. For example, adapting the MPCC model may include adapting one or more coefficients of the leader function and/or the follower function. The coefficients of the leader function and/or the follower function may be adapted based on output from sensors of the vehicle.

For example, as discussed with regards to FIG. 3, output from one or more of a wheel torque sensor, speed sensor, engine speed sensor, and a roll stability control sensor, such as a lateral and/or longitudinal and/or steering wheel position or yaw rate sensors may be used to update the leader function and the follower function. Further, with regards to updating the route grade preview, a location of the vehicle as detected via the GPS device, a selected route for the vehicle, and associated route grade preview information may be used for adapting the leader function and the follower function. Such route grade preview information may be stored locally in controller and/or the GPS device. Alternatively, such route grade preview information may be output to the model adaptor via a wireless connection. For example, the route grade preview information may be output to the model adaptor via the GPS device over a wireless network.

Further, one or more of sensor output of an engine wheel torque, vehicle speed, and an engine speed may be used to update an average velocity. The average velocity such as updated velocity 328 may be used to update the leader function (e.g., MPCC weight tuning function). The average velocity may be updated via a velocity filter, such as velocity filter 326.

After updating the coefficients of the leader function and the follower function based on the output signals of the sensors, and updating the average velocity used in the follower function, method 400 may proceed repeat steps 408-414 with the updated leader MPCC function and the follower MPCC function.

In this way, the MPCC model, which comprises the leader MPCC function and the follower MPCC function, be adapted in real-time in a closed-loop manner. Moreover, method 400 solves for torque command with a Stackelberg game approach and by updating the MPCC model itself (e.g., via weight tuning), thus achieving the technical effect of a more robust cruise control for velocity set-point tracking and improved fuel economy.

The systems discussed herein, and with regards to FIGS. 1-3, along with the methods described herein, and with regard to FIGS. 4-5, may enable one or more systems and one or more methods. In one example, a method comprises, in a cruise control mode, generating a torque command output via a velocity controller that allows for an error within bounds to reduce a fuel consumption amount, the torque command output selected from outcomes of a leader and follower game, and adjusting operation of vehicle torque actuators responsive to the torque command output.

Such vehicle torque actuators may include one or more of an engine and a motor of the vehicle. The engine operation and the motor operation may be adjusted via In a first example of the method, the outcomes of the leader and follower game are based on cost weights calculated by a leader agent and predicted fuel consumption calculated by a follower agent of the leader and follower game. A second example of the method optionally includes the first example, and further includes wherein the predicted fuel consumption calculated by the follower agent is based on the cost weights calculated by the leader agent. A third example of the method optionally includes any one or more of each of the first through second examples, and further includes wherein the leader agent calculates the cost weights via a model predictive controller (MPCC) weight tuning function, and wherein the follower agent calculates the predicted fuel consumption via an MPCC cost function. A fourth example of the method optionally includes any one or more of each of the first through third examples, and further includes wherein the leader and follower game is a Stackelberg game. A fifth example of the method optionally includes any one or more of each of the first through fourth examples, and further includes wherein the error is based on a difference between a filtered vehicle velocity and a set-point velocity. A sixth example of the method optionally includes any one or more of each of the first through fifth examples, and further includes wherein the bounds include relaxing variables. A seventh example of the method optionally includes any one or more of each of the first through sixth examples, and further includes wherein the leader and follower game minimizes cost weights for all terms of cost function except for a fuel consumed term. An eighth example of the method optionally includes any one or more of each of the first through seventh example, and further includes wherein the cost weights are calculated by a leader agent of the leader and follower game, and wherein a follower agent of the leader and follower game then utilizes the cost weights to solve for a model predictive cruise control (MPCC) cost function. A ninth example of the method optionally includes any one or more of each of the first through eight example, and further comprises adapting the MPCC weight tuning function and the MPCC cost function via closed-loop control.

Another example method comprises, via a velocity controller, minimizing cost weights for all terms of a model predictive cruise control (MPCC) cost function except for a fuel consumed term with a leader and follower game, generating a torque command output based on outcomes of the leader and follower game with the MPCC cost function, and adjusting operation of vehicle torque actuators responsive to the torque command output. A first example of the method may further include minimizing the cost weights includes calculating cost weights with a leader agent of the leader and follower game via an MPCC weight tuning function. A second example of the method, which may optionally include the first method, further includes wherein a follower agent of the leader and follower game utilizes the cost weights to weight each term of the MPCC cost function except for the fuel consumed term. A third example of the method, which optionally includes the first through second examples, further includes wherein each of the MPCC cost function and the MPCC weight tuning function are updated via closed-loop control. A fourth example of the method, which optionally includes the first through third examples, further includes wherein the outcomes are bound within a predetermined interval about a set-point vehicle velocity, and wherein the torque command output generated is based on fuel consumption costs of the outcomes. A fifth example of the method, which optionally includes the first through fourth examples, further includes wherein the MPCC cost function includes a grade preview term, the grade preview term based on a vehicle route and grade preview information associated with the vehicle route.

An example system includes, an engine coupled to one or more wheels of the vehicle, a speed sensor to measure a current vehicle speed, a torque sensor to measure a current wheel torque, and a controller with computer readable instructions stored in a non-transitory memory configured to generate a torque command output that allows for an error within bounds to reduce a fuel consumption amount, the torque command output selected from outcomes of a leader and follower game, and adjust operation of the engine based on the torque command. It is further noted that the controller may optionally include instructions to carry out any one or more of the example methods discussed above. In a first example of the system, a GPS device communicatively coupled to the vehicle may further be included, and the MPCC cost function may take into account a grade preview of a vehicle route in generating the torque command, the grade preview of the vehicle route based on an output received from the GPS device. A second example of the system, which optionally includes the first example, further includes wherein a minimum cost weight value is calculated via the MPCC weight tuning function, and wherein each term of the MPCC cost function is weighted with the minimum cost weight value except for the fuel consumed term. A third example of the system, which optionally includes the first through second examples, further includes wherein the controller is further configured to update an MPCC weight tuning function responsive to an output from the speed sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
in a cruise control mode, generating a torque command output for the vehicle via a velocity controller of the vehicle that allows for an error within bounds to reduce a fuel consumption amount, the torque command output selected from outcomes of a leader and follower game, the leader and follower game comprising a leader function and a follower function, wherein the leader function is a leader agent of the leader and follower game, wherein the leader function is a weight tuning function, and wherein the follower function is a follower agent of the leader and follower game; and
adjusting operation of vehicle torque actuators responsive to the torque command output.

2. The method of claim 1, wherein the outcomes of the leader and follower game are based on cost weights calculated by the leader agent and predicted fuel consumption calculated by the follower agent of the leader and follower game.

3. The method of claim 2, wherein the predicted fuel consumption calculated by the follower agent is based on the cost weights calculated by the leader agent.

4. The method of claim 2, wherein the leader agent calculates the cost weights via a model predictive controller (MPCC) weight tuning function, and wherein the follower agent calculates the predicted fuel consumption via an MPCC cost function.

5. The method of claim 1, wherein the leader and follower game is a Stackelberg game.

6. The method of claim 1, wherein the error is based on a difference between a filtered vehicle velocity and a set-point velocity.

7. The method of claim 1, wherein the bounds include relaxing variables.

8. The method of claim 1, wherein the leader and follower game minimizes cost weights for all terms of cost function except for a fuel consumed term.

9. The method of claim 8, wherein the cost weights are calculated by the leader agent of the leader and follower game, and wherein the follower agent of the leader and follower game then utilizes the cost weights to solve for a model predictive cruise control (MPCC) cost function.

10. The method of claim 1, wherein the weight tuning function is an MPCC weight tuning function, and further comprising adapting the MPCC weight tuning function and the MPCC cost function via closed-loop control.

11. A method for a vehicle, comprising:
via a velocity controller, minimizing cost weights for all terms of a model predictive cruise control (MPCC) cost function except for a fuel consumed term with a leader and follower game, wherein the MPCC cost function is a follower function of the leader and follower game, the leader and follower game comprising a leader function and the follower function, wherein the leader function is a leader agent of the leader and follower game, wherein the leader function is an MPCC weight tuning function, and wherein the follower function is a follower agent of the leader and follower game;
generating a torque command output based on outcomes of the leader and follower game with the MPCC cost function; and
adjusting operation of vehicle torque actuators responsive to the torque command output.

12. The method of claim 11, where minimizing the cost weights includes calculating cost weights with the leader agent of the leader and follower game via the MPCC weight tuning function.

13. The method of claim 12, wherein the follower agent of the leader and follower game utilizes the cost weights to weight each term of the MPCC cost function except for the fuel consumed term.

14. The method of claim 12, wherein each of the MPCC cost function and the MPCC weight tuning function are updated via closed-loop control.

15. The method of claim 11, wherein the outcomes are bound within a predetermined interval about a set-point vehicle velocity, and wherein the torque command output generated is based on fuel consumption costs of the outcomes.

16. The method of claim 11, wherein the MPCC cost function includes a grade preview term, the grade preview term based on a vehicle route and grade preview information associated with the vehicle route.

17. A vehicle system, comprising:
an engine coupled to one or more wheels of the vehicle;
a speed sensor to measure a current vehicle speed;
a torque sensor to measure a current wheel torque; and
a controller with computer readable instructions stored in a non-transitory memory configured to:
generate a torque command output that allows for an error within bounds to reduce a fuel consumption amount, the torque command output selected from outcomes of a leader and follower game, the leader and follower game comprising a leader function and a follower function, wherein the leader function is a leader agent of the leader and follower game, wherein the leader function is a weight tuning function, and wherein the follower function is a follower agent of the leader and follower game; and
adjust operation of the engine based on the torque command.

18. The vehicle system of claim 17, further comprising a GPS device communicatively coupled to the vehicle, wherein the follower function takes into account a grade preview of a vehicle route in generating the torque command, the grade preview of the vehicle route based on an output received from the GPS device, and wherein the follower function is a model predictive cruise control (MPCC) cost function.

19. The vehicle system of claim 17, wherein a minimum cost weight value is calculated via the leader function, wherein the leader function is an MPCC weight tuning function, and wherein each term of the MPCC cost function is weighted with the minimum cost weight value except for the fuel consumed term.

20. The vehicle system of claim 17, wherein the controller is further configured to update the leader function responsive to an output from the speed sensor, wherein the leader function is an MPCC weight tuning function.

* * * * *